Jan. 22, 1924.
R. R. KIRSCH
COMBINED FAN AND AIR PUMP MECHANISM
Filed Aug. 5, 1922
1,481,425
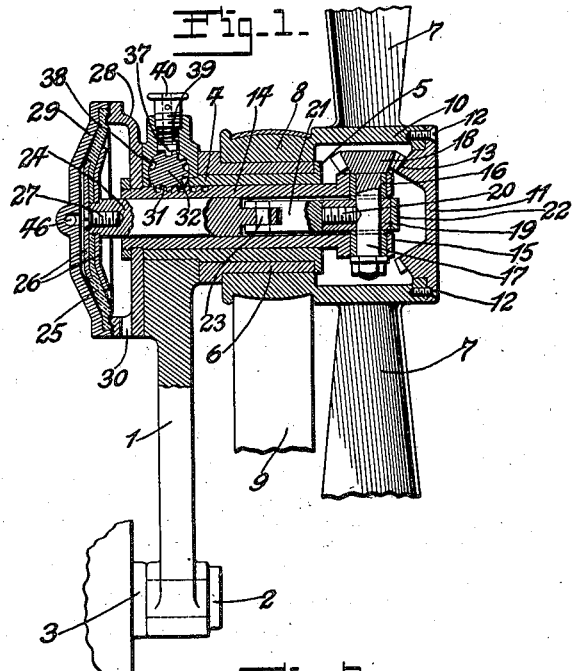
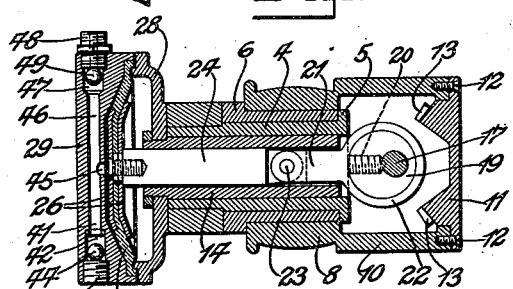
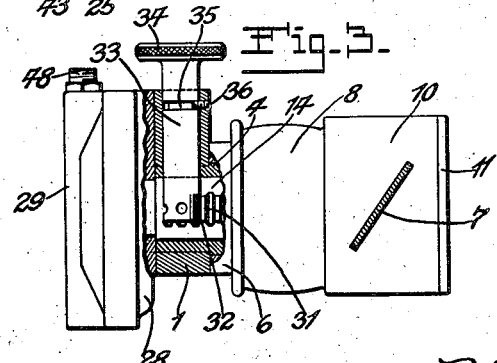
Inventor:
Raymond R. Kirsch,
His Attorneys.

Patented Jan. 22, 1924.

1,481,425

UNITED STATES PATENT OFFICE.

RAYMOND R. KIRSCH, OF ST. LOUIS, MISSOURI, ASSIGNOR TO HEXAGON SPECIALTY MANUFACTURING COMPANY, OF ST. LOUIS, MISSOURI, A CORPORATION OF MISSOURI.

COMBINED FAN AND AIR-PUMP MECHANISM.

Application filed August 5, 1922. Serial No. 579,933.

*To all whom it may concern:*

Be it known that I, RAYMOND R. KIRSCH, a citizen of the United States, residing at St. Louis, Missouri, have invented a new and useful Combined Fan and Air-Pump Mechanism, of which the following is a specification.

This invention relates to combined fan and air pump mechanism.

The embodiment of the invention chosen for illustration is designed and adapted for use in connection with any machine or vehicle having a rotary fan; the invention comprising means for utilizing the operation of a fan to operate an air pump. It will be understood that the invention is specially adapted for use in connection with motor vehicles, the fan being utilized for the usual purpose of cooling the engine and the air pump being utilized for the purpose of inflating the tires of the vehicle. Obviously, however, the air pump mechanism may be utilized for other purposes and its utility is not restricted to the inflation of pneumatic tires.

An object of the invention is to provide an improved fan and air pump mechanism of the nature and character generally mentioned above and hereinafter more particularly disclosed.

In the drawings Fig. 1 is a sectional view showing a preferred embodiment of the invention.

Fig. 2 is a longitudinal cross sectional view taken at right angles to the section of Fig. 1.

Fig. 3 is a plan view with parts shown in section.

In the embodiment shown the invention comprises as a unit a fan, an air pump mechanism, and a bracket supporting the fan and the air pump mechanism and adapted to replace the usual fan bracket and fan, although the device may be initially installed in connection with the engine. The bracket 1 is arranged to be supported by a screw bolt 2 connected with a support 3 in the usual manner. The bracket 1 is mounted at any desired angle of inclination and near its upper end supports rigidly a horizontal sleeve or bushing 4. The outer end of the sleeve or bushing 4 is formed with a circumferential flange 5 constituting an abutment for the outer end of a bushing 6, the inner end of which is adjacent to the bracket 1. The fan 7 has its laterally extended hub 8 secured on the bushing 6, said hub being formed to serve as a pulley for the fan belt 9 which is operated in the usual manner from the engine. The fan has a housing or casing 10 which encloses the operating mechanism for the air pump. The end wall 11 of the housing 10 is removably secured thereto by screws 12 and on its inner side is provided with an annular rack or gear wheel 13.

A non-rotative sleeve 14 is mounted for axial movements within the sleeve or bushing 4. One end of the sleeve 14 extends into the housing 10 and is provided with a bearing 15 having bushings 16 in it in which a short shaft 17 is journaled for rotation. A small pinion 18 on one end of the short shaft 17 is movable into and out of meshing engagement with the annular rack or gear wheel 13 as the sleeve 14 is moved axially from one position to another. An eccentric disc 19 is attached to the short shaft 17 between the two side members of the bearing 15, said disc being held rigid on the shaft by a set screw 20. A rod section 21 within the sleeve 14 has a ring 22 thereon encircling the eccentric disc 19. The rod section 21 has pivot connection 23 with one end of a rod 24, the other end of which rod 24 extends beyond the end of the sleeve 14.

A flexible composition diaphragm 25 is attached to the outer end of the rod 24 being clamped between cooperating dished plates or discs 26 which are held rigid on the end of the rod 24 by a removable screw 27.

The air pump case comprises a dished wall member 28 which is attached to and is movable with the sleeve 14, and a dished wall member 29 attached to the member 28, said two members forming the pump chamber or housing. The edge of the diaphragm 25 is engaged and clamped between the two members 28 and 29, an hermetic joint being formed. One or more air ports 30 are provided through the wall member 28 to facilitate the operation of the pump.

As stated, the pinion 18 is movable into and out of meshing engagement with the annular rack or gear 13. When it is desired to maintain the pump in idle position the pinion 18 is disengaged from the rack or gear 13; and when it is desired to operate the pump the pinion 18 is moved into meshing engagement with the rack or gear 13.

A rack 31 on the sleeve 14 meshes with a segmental rack or gear 32 on the inner end of a stem 33 mounted for rocking or turning movements within a hole formed in the bracket 1 for that purpose, and equipped with a knob or hand wheel 34 whereby the stem may be turned. As shown, the stem 33 is formed with a circumferential groove 35 (Fig. 2) receiving the end of a screw 36 in the bracket 1, whereby the stem is prevented from axial movements while rocking or turning movements thereof are permitted. Obviously, by turning the stem 33 in one direction the sleeve 14 will be moved axially to place the pinion 18 in meshing engagement with the annular rack or gear wheel 13; and by turning the stem 33 in the other direction the sleeve 14 will be moved axially to disengage the pinion 18 from the annular rack or gear wheel 13 to permit the fan to operate while the pump remains idle.

A latch device is provided for holding the parts in their different adjusted positions, the same comprising a detent 37 arranged for engagement in recesses 38 (Fig. 1) in the stem 33 and actuated to engaging position by a coil spring 39. A finger knob or hold 40 is provided on the outer end of the detent 37 for withdrawing the detent from the recesses 38 to permit turning or rocking of the stem 33.

The wall member 29 is provided with an air inlet port 41 (Fig. 2) having a valve chamber 42 provided with a vented plug 43 and a valve 44 of familiar construction which will permit air to be drawn into the pump housing as an incident to movement of the diaphragm away from the wall member 29 and which will be automatically closed to prevent egress of the air when the diaphragm is moved toward the wall member 29.

The valve shown is of a familiar and well known type and requires no further description, and it will be understood that I do not restrict myself to this form of valve but may utilize other well known appropriate forms of valves.

The passage 41 is continuous across the wall member 29 and opens into the pump chamber through a communication 45. Beyond the opening 45 the continuous passage is indicated by 46, the portion 46 of said passage constituting the air outlet passage. At the outer end of the passage 46 a valve chamber 47 is provided, the same being equipped with a fitting 48 for connection with an air hose and controlled by a valve 49 permitting the air to be forced out and preventing suction of the air therethrough. The valve 49, like the valve 44, is of familiar and well known construction and operation and is conventionally shown, as the specific form of such valves is immaterial.

When it is desired to operate the air pump the hose is connected to the fitting 48 and the controlling devices are operated to place the pinion 18 in meshing engagement with the annular rack or gear wheel 13. The operation of the fan reciprocates the rod 21—24 and operates the diaphragm device of the pump. This causes the air to be drawn into the pump past the valve 44 and forced through the valve 49. The air, of course, may be utilized for any desired purpose. When it is desired to prevent further operation of the pump it is only necessary to operate adjusting devices therefor to move the pinion 18 out of meshing engagement with the annular rack or gear 13, leaving the fan in operation while the pump remains idle.

From the foregoing it will be seen that my invention is a unitary fan and pump mechanism adapted to be manufactured as such, and applied to use in place or substitution of present or other fan structures not equipped with air pump mechanism. Although the invention is specially useful for the above stated purpose it may, with equal advantage, be initially installed as a part of the original motor equipment. I contemplate using the invention for all purposes to which it may be usefully applied. I do not restrict myself unessentially in any particular, but what I claim and desire to secure by Letters Patent is:—

1. The combination with a stationary support, a fan mounted for rotation on the support, and means for rotating the fan, of an air pump, a device mounted in the support for supporting and operating the air pump, and means for moving said device to and from a position in which it will be operated by the fan.

2. The combination with a stationary support, an element mounted for rotation on the support, and means for rotating said element, of an air pump, a device mounted in the support for supporting and operating the air pump, means for moving said device to and from operative position, and means for operating said device and thereby the pump by said element when said device is in operative position.

3. Mechanism of the character described, comprising a stationary support, a rotary fan carried by said support, means for rotating the fan, a pump, a device mounted in the support for supporting and operating the pump, means for moving said device to and from operative position, gearing supported in part by the fan and in part by said device for operating said device, and means operated by said gearing for operating said device.

4. Mechanism of the character described comprising a stationary support, a rotary fan carried by the support, means for rotating the fan, an axially movable sleeve in said support, an axially movable device mounted in said sleeve, pump mechanism supported by said axially movable device, and gearing operated by the fan for imparting axial movements to said device in one position of said sleeve.

5. Mechanism of the character described, comprising a support, a sleeve carried by said support, a rotary fan carried by said sleeve, means for rotating said fan, a pump, a support for said pump extending through said sleeve, means for moving said second support to place the pump in or out of operative position as desired, and operating mechanism for said pump extending through the sleeve for operation by the fan.

6. Mechanism of the character described, comprising a support, a sleeve carried by said support, a rotary fan carried by said sleeve, means for rotating said fan, a pump, a support for said pump extending through said sleeve, means for moving said second support to place the pump in or out of operative position as desired, operating mechanism for said pump extending through the sleeve for operation by the fan, and gearing for operating said operating mechanism.

7. Mechanism of the character described, comprising a support, a sleeve carried by said support, a rotary fan carried by said sleeve, means for rotating said fan, a pump, a support for said pump extending through said sleeve, operating mechanism for said pump extending through the sleeve for operation by the fan, gearing for operating said operating mechanism, and means carried by said support for moving said operating mechanism and said gearing to and from position to be operated by the fan.

8. Mechanism of the character described, comprising a support, a sleeve carried by said support, a rotary fan carried by said sleeve, means for rotating said fan, a pump, a support for said pump extending through said sleeve, operating mechanism for said pump extending through the sleeve for operation by the fan, gearing for operating said operating mechanism, means carried by said support for moving said operating mechanism and said gearing to and from position to be operated by the fan, and a latch device for holding the operating mechanism in or out of position to be operated by the fan.

9. Mechanism of the character described, comprising a support, a sleeve rigid in the support, a rotary fan carried by the sleeve, a housing in connection with the fan, a gear element rigid with the fan in the housing, a reciprocable rod extending through said sleeve, means for reciprocating said rod by said gear element, a device for moving said means to and from position for operation by said gear element, and a pump operated by said rod.

10. Mechanism of the character described, comprising a sleeve, a fan supported by said sleeve for rotation, means for rotating said fan, a housing in connection with said fan, a gear element in said housing, a reciprocable rod extending through said housing, a shaft in said housing, a pinion on said shaft, a device for reciprocating said rod by the rotation of said shaft, means for moving said rod to place said pinion in or out of mesh with said gear element, and a pump device operated by said rod.

11. Mechanism of the character described, comprising a sleeve, a fan supported by said sleeve for rotation, means for rotating said fan, a housing in connection with said fan, a gear element in said housing, a reciprocable rod extending through said housing, a shaft in said housing, a pinion on said shaft, a device for reciprocating said rod by the rotation of said shaft, means for moving said rod to place said pinion in or out of mesh with said gear element, a pump device operated by said rod, and means for preventing accidental movement of said rod.

12. Mechanism of the character described, comprising a sleeve, a fan supported by said sleeve for rotation, a housing in connection with said fan, a gear element in connection with said fan in said housing, a pump device, a rod extending through said sleeve for operating said pump device, a pinion in said housing movable into and out of mesh with said gear element for reciprocating said rod, and a device operated by said pinion for reciprocating said rod when said pinion is rotated by said gear element.

13. Mechanism of the character described, comprising a sleeve, a fan supported by said sleeve for rotation, a housing in connection with said fan, a gear element in connection with said fan in said housing, a pump device, a rod extending through said sleeve for operating said pump device, a pinion in said housing movable into and out of mesh with said gear element for reciprocating said rod, a device operated by said pinion for reciprocating said rod when said pinion is rotated by said gear element, and means for preventing accidental axial movement of said rod.

14. A unitary mechanism of the character described, comprising a support, a rotary fan mounted on said support, a gear element operated by said fan, a rod mounted for axial movements in said support, mechanism for reciprocating said rod by operation of said gear element, means for moving said mechanism into and out of engagement with said gear element, and a pump device operated by said rod.

15. A unitary mechanism of the character described, comprising a support, a rotary fan mounted on said support, a gear element operated by said fan, a rod mounted for axial movements in said support, mechanism for reciprocating said rod by operation of said gear element, a pump device operated by said rod, and means for moving said rod to and from position for operation by said gear element.

16. A unitary mechanism of the character described, comprising a support, a rotary fan mounted on said support, a gear element operated by said fan, a rod mounted for axial movements in said support, mechanism for reciprocating said rod by operation of said gear element, a pump device operated by said rod, means for moving said rod to and from position for operation by said gear element, and a latch cooperating with said moving means for preventing accidental movement of said rod.

RAYMOND R. KIRSCH.